W. W. BROWER.
THRESHING MACHINE.
APPLICATION FILED FEB. 1, 1908.
1,060,890.
Patented May 6, 1913.
3 SHEETS—SHEET 1.
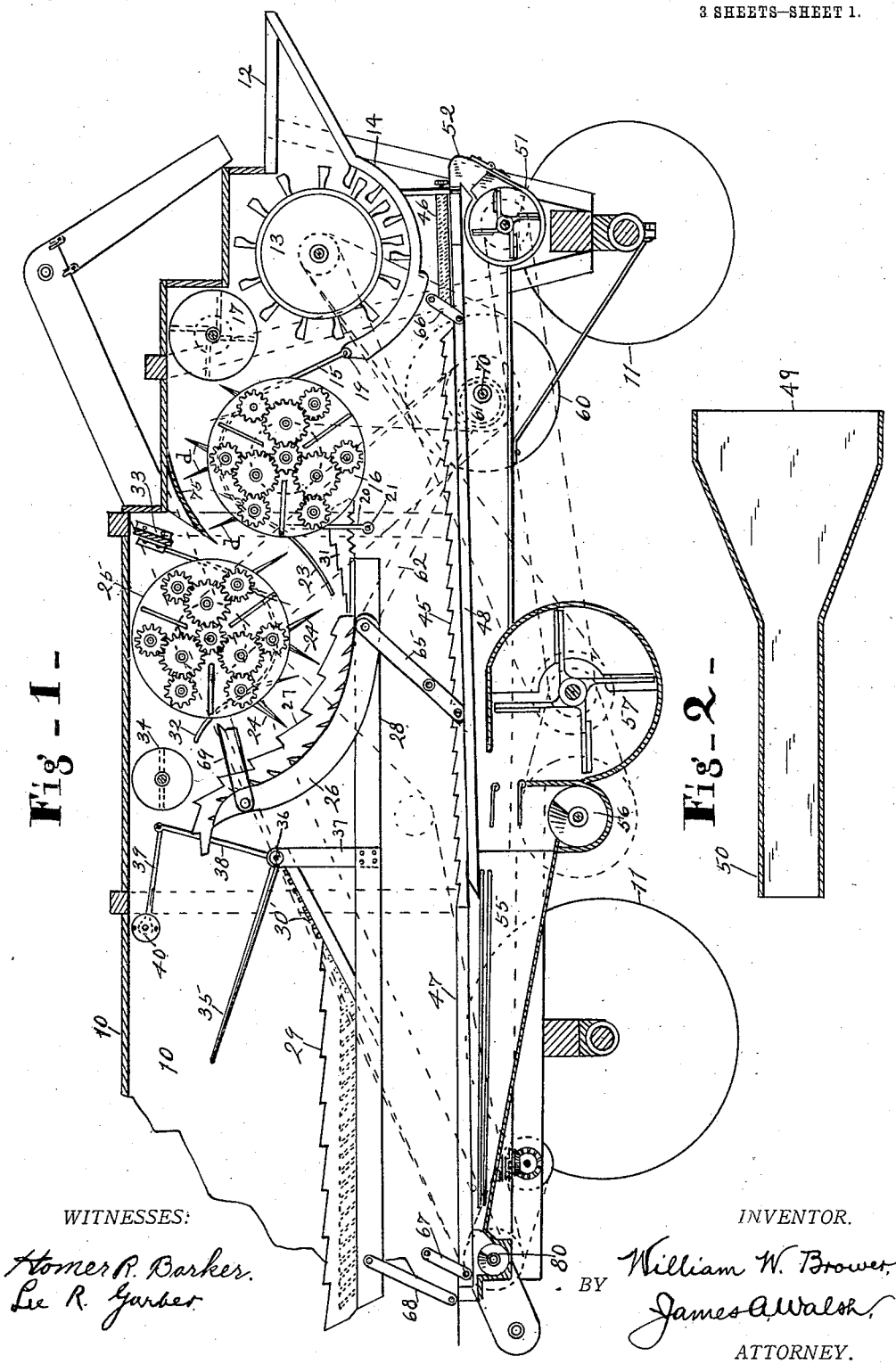
WITNESSES:
Homer R. Barker.
Lee R. Garber
INVENTOR.
William W. Brower,
BY James A. Walsh,
ATTORNEY.

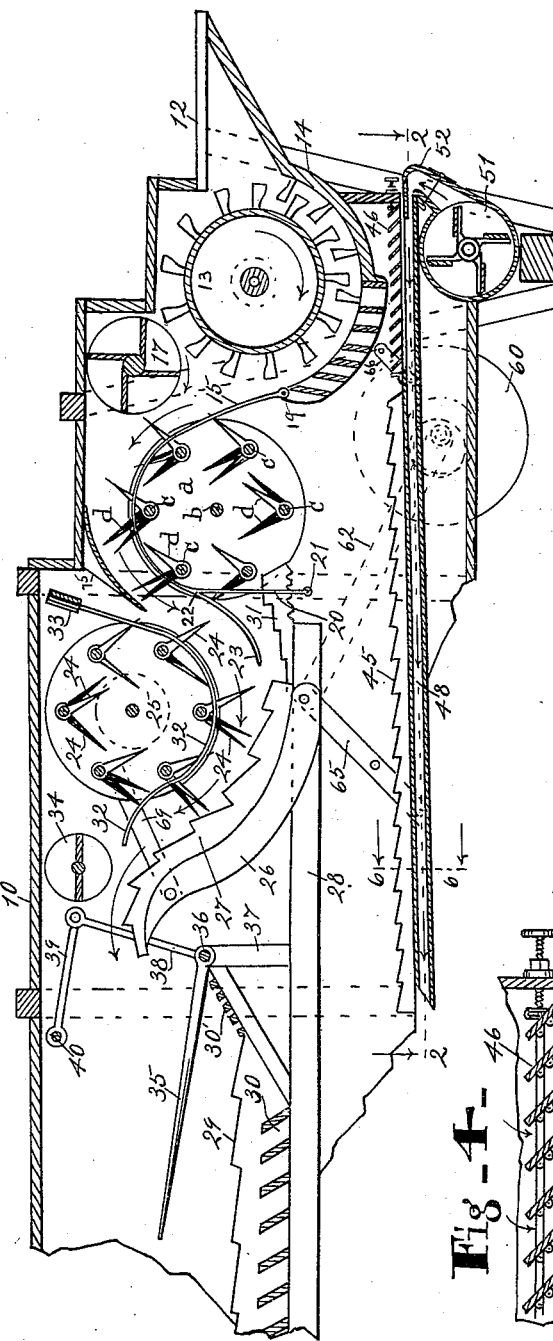

W. W. BROWER.
THRESHING MACHINE.
APPLICATION FILED FEB. 1, 1908.

1,060,890.

Patented May 6, 1913.

3 SHEETS—SHEET 3.

Fig-7.

WITNESSES:

INVENTOR.

William W. Brower,
BY James A. Walsh,
ATTORNEY.

UNITED STATES PATENT OFFICE.

WILLIAM W. BROWER, OF OLDS, ALBERTA, CANADA, ASSIGNOR, BY MESNE ASSIGNMENTS, TO THE SATTLEY STACKER COMPANY, OF INDIANAPOLIS, INDIANA, A CORPORATION OF MAINE.

THRESHING-MACHINE.

1,060,890.   Specification of Letters Patent.   Patented May 6, 1913.

Application filed February 1, 1908. Serial No. 413,859.

*To all whom it may concern:*

Be it known that I, WILLIAM W. BROWER, a citizen of the United States, residing at Olds, in the Province of Alberta, Canada, have invented certain new and useful Improvements in Threshing-Machines, of which the following is a specification.

My invention relates to improvements in threshing machines and consists in certain details of construction and arrangements of parts whereby I am enabled to produce such a machine materially reduced in size from ordinary and well known types, which consequently will occupy considerably less space in storing and shipping and be more conveniently handled when moving it from place to place, while at the same time insuring a maximum separating capacity by the novel arrangement of separating devices which I employ, consisting of a group of rotary separating elements and coöperating devices compactly arranged in such manner that the material in process of separation will be caused to travel a considerable distance within a comparatively small space in an undulating mass from the feeding to the discharge end of the machine and be subjected continuously to the action of the separating devices.

The accompanying drawings illustrate my invention.

Figure 1 is a side elevation of a separator embodying my invention, the wall thereof being removed to show the separating devices and arrangement thereof; Fig. 2 is a plan of the grain chute which is a feature of my invention, as seen when looking in the direction indicated by the arrows 2—2 in Fig. 3; Fig. 3 a longitudinal sectional view through the threshing machine, a portion thereof being broken away; Fig. 4 a detail section showing the grain chute and fan structure associated therewith, an adjustable screen being also shown above said pan; Fig. 5 a fragmentary detail of the straw strippers and parts associated therewith; and Fig. 6 a cross-section of the grain chute as seen when looking in the direction indicated by the arrows 6—6 in Fig. 3; and Fig. 7 a plan of the rotary and associated separating devices.

In the drawings, the portions marked 10 indicate the casing of the threshing machine in which the separating mechanism is contained, and 11 the usual carrying wheels for transporting the machine. The initial or feeding end 12 of the separator may be of any approved form suitable to convey straw to the primary rotary threshing and separating mechanism, such as a cylinder, 13, in connection with a concave, 14. As the straw emerges from between the cylinder and concave it travels upwardly along and is guided by the inclined portion of the straw guide or grating, 15, toward the rotary separator, 16, onto which it is assisted by the rotary beater, 17, and which also assists in stripping the straw from the cylinder and prevents its winding thereabout, which beater is positioned intermediate the cylinder and said rotary separator 16. The rotary separator 16 which I have chosen to illustrate in connection with my invention consists of a pair of rotary heads $a$ mounted on a central driving shaft $b$, and a series of shafts $c$ mounted in said heads near the edges thereof, each of which shafts is provided with a series of straw engaging teeth $d$ arranged to be held in substantially fixed position relatively to the horizontal and preferably staggered in relation to each other, these shafts $c$ being revolved about the driving shaft through a system of planetary gearing as indicated in the drawings (Fig. 1), so that the teeth $d$ will be maintained in a desired position throughout their movement around the central shaft, projecting through the straw guide or grating 15 at the upper and receding therethrough at the rear lower portion of the rotary separator and to within said separator. The specific construction and arrangement of cylinder 13, as well as that of the rotary separator just described, however, is not the subject of my present invention, and, therefore, will only be referred to incidentally herein in describing the same, for, as will be readily understood, I may employ a cylinder and a rotary separating element of any approved form, the separator, however, being provided with teeth arranged to operate as above stated.

The straw guide, 15, consists of a series of curved rods (Fig. 7), preferably attached to a rod, 19, supported in the concave 14, or in any convenient manner adjacent the cylinder. These rods 15 incline upwardly, then curve about the separator and terminate below the rear side thereof, where the ends, 20, of said rods, are secured to a rod, 21, extending transversely of the machine. From the termination of the curve of these rods constituting the straw guide, as at 22 (Fig. 3), I affix to each a conveying finger, 23, which series of fingers are preferably slightly curved as indicated. The straw guide and conveying fingers are so arranged that as the separator is rotated each of the series of advancing vertically maintained teeth $d$ while at the point of projection from the upper portion thereof will pass between a pair of the straw-guide members 15 (Fig. 7), combing and carrying with them the material in the path thereof and delivering it to the rear end of the straw guide where such teeth clear themselves from the material and recede within the rotary separator, as indicated in Fig. 3. As a large number of such teeth, arranged in series as indicated, are employed in a separator of this character, it will be understood that as the material is discharged from the threshing devices (cylinder and concave) and caught up by the projecting teeth of and carried over the rotary separator 16 it is subjected to a continuous combing and separating process. This process continues as the material leaves the rotary separator by coming in contact with the projecting teeth, 24, of a rotary separator, 25, similar in all respects to the rotary separator 16 already referred to, except that its teeth 24 project from the lower portion thereof, so that as the material is moving over the conveying fingers 23 it is caught by the separator teeth 24 and carried across an oscillatory rack arranged and movably maintained approximately concentrically with said separator 25, which rack is composed of a suitable frame, 26, in which fish-back members, 27, are longitudinally arranged, said rack being pivotally mounted in a reciprocating straw rack, 28, provided at its rear end with fish-backs, 29, and openings, 30, and an inclined portion 30' having transverse openings therein. A stripper, 31, composed of a series of notched or offset members is secured to said reciprocating rack 28, and these bars lie between the straw-guide members 20, for a purpose which will be hereinafter described.

The rotary separator 25 is also provided with a series of members constituting a straw guide, 32, similar to straw-guide 15 of rotary separator 16, the forward ends of its members being secured to a transverse support, 33, and extending downwardly and curving about the rotary separator 25, then curving upwardly and projecting beyond the same. As the material is moved across and up over the end of the oscillatory rack 26 these projecting straw-guide members 32 act as strippers for the teeth of rotary separator 25 and as deflectors to direct the material between the upper end of said rack and a beater, 34, which propels it from said rack, whence it falls to an agitator comprising a series of fingers, 35, mounted on a transverse rod, 36, secured to a support, 37, on the reciprocating rack 28, which fingers are actuated to move upwardly and downwardly by a crank-lever the lower arm, 38, of which is secured to said rod 36, and the upper arm, 39, of which is provided with a crank mounted in a suitable bearing, 40, in the casing of the machine, and which fingers are caused to actuate by the movement of reciprocating rack 28.

Beneath the mechanisms just described is a grain pan, 45, of ordinary or desired form, as indicated in Fig. 1, the forward end of which is provided with a screen, 46, of any desired form, and at the rear end of said grain pan is placed a slatted chaffer, 47, also of a common and well known form. Beneath said grain pan I provide a grain chute, 48, preferably of the form indicated in Fig. 2, its front and widest end, 49, lying beneath screen 46, and converging to a narrow form, as 50, which continues to its discharge end. At the forward end of and preferably beneath said chute 48 I provide a fan, 51, having a hinged outlet, 52, flexibly connected by suitable material, such as canvas 53, to said chute. By thus hinging said fan I am enabled to throw the outlet thereof away from the grain chute so as to have access thereto or to the screen above, while the flexible connection 53 prevents dust and debris from falling into the fan casing and at the same time retains the outlet when withdrawn from the chute, as shown in Fig. 4. At the rear end of the grain pan and chute I provide a chaff screening structure or shoe, 55, a grain auger, 56, and fan, 57, of any desired form and which are common to machines of this character.

As is customary with grain threshing machines of this general character, the separating mechanism is preferably actuated by power transmitted from the cylinder shaft; and in the present case I employ a suitably mounted pulley, 60, (shown in full and dotted lines, Fig. 1) belted to the cylinder pulley, from which pulley 60 driving belts are run to the rotary separators 16 and 25. The shoe fan 57 is also driven by a belt running from a cylinder pulley to the fan pulley, which in turn, by a belt as shown, drives the fan 51 which discharges its blast into the grain chute, and the grain auger 56 is likewise driven by a belt communicating therewith and with the shoe fan. Each of the belts referred to is clearly indicated by dotted lines in Fig. 1 of the drawing.

Mounted on the shaft of pulley 60 is an eccentric, 61, (shown in dotted lines, Fig. 1), to which is connected a pitman, 62, (also shown in dotted lines, Fig. 1), which pivotally engages racks 26 and 28. Also pivotally engaging these racks are links, 65, one on each side thereof, which are attached to grain pan 45, and at the forward end of each side of said grain pan is a link, 66, pivotally secured to the frame of the threshing machine, while at the rear end of the slatted chaffer-board 47 is a similar link, 67, attached to the machine frame, and adjacent said link 67 is another link, 68, connecting rack 28 to the machine frame. On each side of rack 26 I also provide links, 69, secured thereto and to the separator casing by which links said rack is movably maintained in position relatively to said separating device while being oscillated by the reciprocating rack 28. As will be readily understood, all of the parts herein described as being linked together or to the machine casing are capable of reciprocating movement when actuated, and when the various rotary elements are properly belted and the cylinder shaft rotated said cylinder and the rotary separators are rotated, and at the same time pitman 62, eccentrically mounted on shaft 70, imparts reciprocatory motion to rack 28. Simultaneously with the horizontal vibration of said rack 28 the oscillating rack 26 is actuated to move back and forth in a curvilinear path concentric with the rotary separator 25, while at the same time the agitating fingers 35 supported above rack 28 are caused to vibrate vertically. While these parts are in motion the grain chute and pan, and the slatted chaffer 47, movably supported by the links 66, 67, respectively, are reciprocally actuated by means of link 65 which receives its motion from the operation of pitman 62 upon racks 28, 26. During the rotation and vibration of the various elements referred to the shoe-fan and auger are also in operation, and the forward fan 51, through motion imparted from the shoe-fan pulley, is creating and discharging a blast into and through grain chute 48.

In the operation of separating grain by my improved machine, the material is fed into the cylinder, taking a downward course, as indicated by the arrow, Fig. 3, and while passing between the cylinder and concave the greater portion of the grain is threshed and separated from the straw and falls through the orifices in the concave onto screen 46 and thence into the grain chute, a small portion of such falling grain, however, which does not fall on the screen lodging on the grain pan. The material issuing from beneath the cylinder is guided by and travels upwardly over the straw guide 15 in the direction indicated by the arrow, and is caught by the revolving projecting teeth $d$ of rotary separator 16 and combed and separated while being carried over said separator, the beater 17 at the same time stripping the cylinder teeth and deflecting the material toward said separator. As the mass of material advances it is caused to move downwardly by the deflector, 75, which I have provided, and in the direction of the conveying and stripping fingers 23, in which downward movement it is caught by the revolving projecting teeth 24 of rotary separator 25, and carried rearwardly across the oscillating rack 26, the straw-guide 32 and said rack 26 both lying approximately concentric with the separator and forming a retaining means within which the mass of material is confined and slightly retarded in its progress so as to be subjected to the combing action and separation of said teeth while being moved rearwardly by the action of said oscillatory rack and the revolution of each series of said teeth, the combined action of which elements and the rack 28 causes the grain which has been separated at this point to drop through to the grain pan 45 beneath. As the material is being rapidly carried over the separator 16 its revolving teeth recede and clear themselves as they pass through the conveying and stripping fingers 23, and when they have passed entirely through the rear end of straw guide 15, as at 20, should any loose straws have lodged between the members thereof they are swept off by the sweeper members 31, on the forward end of rack 28, which partake of its reciprocating motion, and because of their offset and notched upper and lower edges dislodge such straws as may lie in their path. As the material passes from beneath rotary separator 25 and is traveling toward the rear upper end of rack 26, the projecting straw-guide members 32 serve to strip the separator teeth as they pass upwardly therethrough, and to guide the material to between the end of said rack and the beater 34, and as it falls thereover onto the agitating fingers 35 it is tossed and tumbled about and thoroughly loosened and delivered to the rear of reciprocating rack 28, and any small amount of grain that may have been carried thus far in the straw is separated by these agitating fingers and falls therethrough and through the straw rack to the slatted chaffer below, the straw being propelled to the discharge end of the machine by the action of said reciprocating rack 28, where it is further agitated, and any surplus grains which may have escaped separation to this point will fall to the shoe below.

While so much of the operation of the machine proceeds, the greater portion of the separated grain, as before indicated, is falling from the cylinder into the grain chute, while such as does not enter the chute and that separated by the succeeding devices, together with chaff and dust, falls to the grain pan 45, which chute and pan are being reciprocated by the link system hereinbefore described, causing the material on the pan to travel to the cleaning shoe 55. As this material reaches the chaffer the air blasts from fans 51 and 57 separate the chaff from the grain, the latter falling into the shoe, and, together with that discharging from the grain chute, is conducted from the machine by the auger, as is usual. As will be readily understood, the grain in reciprocating chute 48 is moved to the discharge end thereof by the agitation of the chute, and the slight amount of chaff and dust if any mingled therewith is swept by the air blast from said fan 51 through said chute and out over the grain shoe 55, the large proportion of grain entering this chute being thoroughly cleansed and freed from dust and chaff, so that when it reaches the discharge end of the chute no further cleaning is necessary, and it discharges at once into the shoe, any possible small amount of chaff and dust, as before stated, passing out over said shoe, while such unthreshed grain, chaff and short straws that may have been carried out over the chaffer or shoe falls into an auger (as 80) by which it is conveyed to the ordinary tailings elevator and delivered to the cylinder, as usual. The flexible connection 53 which I have provided between the fan outlet and the grain chute insures a substantially air tight joint between these elements, the loose fitting of said connection permitting it to follow the chute as it moves back and forth and without moving or disturbing the outlet in its relation to the chute.

As indicated by the series of arrows in Fig. 3, during the threshing operation the mass of material is continuously traveling through the separating mechanism in a wavy condition from the feeding to substantially the discharge end of the machine, being subjected through its under and upper sides to the constant action of the rapidly revolving combing teeth of the rotary separators and finally to the agitating and reciprocating mechanism described, by which arrangement and the associated vibrating mechanism and fans I obtain a thorough separation and cleaning of the grain within a comparatively limited space; and in actual experience in the field I have demonstrated that ordinary and well known types of threshing machines of a predetermined capacity, when materially reduced in height and at least one-fourth in length and equipped with the separating and cleaning devices arranged as herein described, will readily and efficiently handle the same or a greater amount of material.

I claim as my invention:

1. The combination, in a threshing machine, of threshing means, rotary separating devices, straw guiding means passing around a portion of each of said separators, a reciprocating rack located in rear of the threshing means, strippers mounted on the forward end of said reciprocating rack adapted to pass between the straw guide members of the forward rotary separator, and an oscillatory rack in the rear of said separators.

2. The combination, in a threshing machine, of threshing means, rotary separating devices, straw guiding means passing around a portion of each of said separators, a reciprocating rack located in rear of the threshing means, strippers adapted to pass between the straw guide members of the forward rotary separator, an oscillatory rack in the rear of said separators, and an agitator in the rear of said separators for intercepting and separating material delivered from said rack.

3. The combination, in a threshing machine, of threshing means, rotary separating devices, straw guiding means passing around a portion of each of said separators, a reciprocating straw rack located in rear of the threshing means, strippers at the forward end of said rack adapted to pass between the straw guide members of the forward rotary separator, and an oscillating rack mounted upon said reciprocating rack in the rear of said strippers.

4. In a threshing machine, a reciprocating straw rack, strippers thereon, an oscillating rack pivotally connected to said reciprocating rack, a grain pan beneath said elements, a grain chute associated with said grain pan, means for pivotally connecting said reciprocating rack and said grain pan, and means for imparting motion to said reciprocating rack whereby said grain pan is given reciprocating action.

5. The combination, in a threshing machine, of the threshing cylinder, a concave therefor, a toothed rotary separator in rear of said cylinder, means for stripping said cylinder and directing material toward said separator, straw guiding means about said separator through which the teeth thereof project and move, a toothed rotary separator in rear of said first mentioned rotary separator, straw guiding means around said rear separator through which the teeth thereof project and move, and means beneath said rear rotary separator for receiving and retaining the moving material in position to be separated by the teeth of said rear rotary separator.

6. The combination, in a threshing machine, of the threshing cylinder, a concave therefor, a toothed rotary separator in rear of said cylinder, means for stripping said cylinder and directing material toward said separator, straw guiding means about said separator through which the teeth thereof project and move, a toothed rotary separator in rear of said first mentioned rotary separator, means between said rotary separators for directing material to the rear separator, straw guiding means around said rear separator through which the teeth thereof project and move, and means beneath said rear rotary separator for receiving and retaining the moving material in position to be separated by the teeth of said rotary separator.

7. In a threshing machine, the combination of rotary threshing and separating elements and means for guiding material through the path of movement of the teeth of said separators, of a reciprocating straw rack beneath the rear separator and extending to the rear of the machine, strippers on the forward end of said rack and passing between the straw guides of the forward rotary separator, a pivotally mounted curved rack associated with said reciprocating rack and positioned adjacent said rear rotary separator, and means for actuating said reciprocating rack whereby said strippers reciprocate between and remove material from said straw guides and said oscillating rack is actuated to shake and move material retained thereby toward its rear end.

8. In a threshing machine, the combination of rotary threshing and separating elements and means for guiding material through the path of movement of the teeth of said separators, of a reciprocating straw rack beneath the rear separator and extending to the rear of the machine, strippers on the forward end of said rack and passing between the straw guides of the forward rotary separator, a series of movable fingers mounted on said rack, a pivotally mounted curved rack associated with said reciprocating rack and positioned adjacent said rear rotary separator, and means for actuating said reciprocating rack whereby said strippers are caused to move back and forth and remove material from said straw guides, said curved rack to oscillate and remove material toward its rear end and said movable fingers to agitate such removed material.

In testimony whereof I affix my signature in presence of two witnesses.

WILLIAM W. BROWER.

Witnesses:
R. P. WALROD,
E. S. BROWER.

---

Copies of this patent may be obtained for five cents each, by addressing the "Commissioner of Patents, Washington, D. C."